US011235517B2

(12) United States Patent
Cunningham et al.

(10) Patent No.: US 11,235,517 B2
(45) Date of Patent: Feb. 1, 2022

(54) ADDITIVE MANUFACTURING METHOD AND MACHINE FOR PRODUCING COMPOSITE PRODUCTS

(71) Applicant: GM Global Technology Operations LLC, Detroit, MI (US)

(72) Inventors: Andrew Thomas Cunningham, Royal Oak, MI (US); Brennon L. White, Novi, MI (US); Paul J. Wolcott, Macomb, MI (US); Ali Shabbir, Mississauga (CA); Zachary P. Steffes, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/361,685

(22) Filed: Mar. 22, 2019

(65) Prior Publication Data

US 2020/0298472 A1 Sep. 24, 2020

(51) Int. Cl.

| | |
|---|---|
| ***B29C 64/00*** | (2017.01) |
| ***B29C 64/147*** | (2017.01) |
| ***B29C 64/393*** | (2017.01) |
| ***B29C 64/20*** | (2017.01) |
| *B29C 64/188* | (2017.01) |

(52) U.S. Cl.

CPC ............ *B29C 64/147* (2017.08); *B29C 64/20* (2017.08); *B29C 64/393* (2017.08); *B29C 64/188* (2017.08); *B29C 2793/0054* (2013.01); *Y10T 156/1082* (2015.01); *Y10T 156/1357* (2015.01); *Y10T 156/1361* (2015.01); *Y10T 156/1365* (2015.01); *Y10T 156/1749* (2015.01); *Y10T 156/1751* (2015.01); *Y10T 156/1788* (2015.01)

(58) Field of Classification Search

None

See application file for complete search history.

(56) References Cited

U.S. PATENT DOCUMENTS 5,578,155 A * 11/1996 Kawaguchi ........... B29C 64/188 156/267

10,829,629 B2 * 11/2020 Harrison ................ C08L 27/06

FOREIGN PATENT DOCUMENTS

CN 108638518 A 10/2018

CN 108650116 A 10/2018

* cited by examiner

*Primary Examiner* — Linda L Gray

(74) *Attorney, Agent, or Firm* — Quinn IP Law

(57) ABSTRACT

An additive manufacturing method comprises: positioning a sheet of composite material; curing a predetermined portion of the sheet; cutting the sheet about the perimeter of the predetermined portion to create a preceding processed sheet; adding a successive sheet of composite material atop and in contact with the preceding processed sheet; curing a predetermined portion of the successive sheet such that the predetermined portions of the successive sheet and the preceding processed sheet are bonded together; and cutting the successive sheet about the perimeter of its predetermined portion to create a subsequent processed sheet. The steps of adding, curing and cutting a successive sheet may be repeated for a plurality of cycles to produce a three-dimensional composite product.

12 Claims, 5 Drawing Sheets

10
L12
L11
L10
L9
L8
L7
L6
L5
L4
L3
L2
L1
12

ADDITIVE MANUFACTURING METHOD AND MACHINE FOR PRODUCING COMPOSITE PRODUCTS

INTRODUCTION

This disclosure generally relates to additive manufacturing, and more particularly to additive manufacturing machines and methods for producing composite products.

Three-dimensional printing (3DP) is an additive manufacturing (AM) process of building up a component layer by layer. 3DP works by depositing a relatively small amount of material at a time, much like a printer deposits a very small amount of ink at a time to produce a single layer of print on a sheet of paper. To borrow this printing analogy, one can think of 3DP as a process of adding successive layers of "ink" (or whatever material is used) on top of each other. The material used in 3DP is typically a thermoplastic material which is melted (or is already in liquid form) and is injected or deposited in very small amounts at a time onto a substrate or platen as a first layer. The deposited material solidifies, dries or sets immediately after deposition, and the small depositions are deposited very closely together so as to merge or bond together to form a continuous layer. That is, as a layer is constructed by depositing thousands of small depositions side-by-side, adjacent depositions merge or bond together to form a continuous layer with no spaces or voids between adjacent depositions. This continuity between depositions occurs not only within each layer, but also between adjacent layers. Thus, when a successive layer is deposited upon a preceding/underlying layer, the depositions of the successive/top layer will merge or bond with the adjacent depositions of the preceding/underlying layer.

Due to the very small deposition size that can be achieved and the ability for adjacent depositions to intimately merge or bond together, very intricate three-dimensional (3D) structures can be constructed by the 3DP AM process. However, the typical 3DP process is not well suited for constructing large, structural components which require significant load-bearing or wear-resisting capability. For such purposes, 3DP has been adapted to deposit small depositions of thermoset resins containing high-strength particles or short strands of fiberglass, carbon fiber or the like within each deposition. While this type of 3DP process utilizing thermoset resins and structural materials is better for structural, load-bearing and wear-resistant applications than conventional 3DP using thermoplastic depositions, it still has limitations. For example, the small size of the individual depositions means the structural material (e.g., chopped fiberglass or carbon fiber particles) is provided in very small amounts at a time, so even though the structural material is present throughout the entire part, the structural material does not run in continuous, uninterrupted form throughout each layer, thus limiting the load-bearing capacity of the overall component.

It would be desirable, therefore, to provide an improved way of producing components utilizing 3DP/AM methods which avoids or minimizes these and other limitations.

SUMMARY

As an example of a 3DP AM process, the component 10 shown in FIGS. 1 and 2 may be built up in a layer-wise fashion as illustrated in FIG. 3. A first layer L1 is deposited on a substrate or platen 12, then a second layer L2 is deposited on top of the first layer L1, and this process of adding successive layers is continued until the final layer L12 is completed. Although only twelve layers are shown for illustrative purposes in FIG. 3, a typical component 10 constructed by a 3DP process may have dozens, hundreds or thousands of layers.

According to one embodiment, an additive manufacturing method includes: positioning a sheet of composite material; curing a predetermined portion of the sheet; cutting the sheet about the perimeter of the predetermined portion to create a preceding processed sheet; adding a successive sheet of composite material atop and in contact with the preceding processed sheet; curing a predetermined portion of the successive sheet such that the predetermined portions of the successive sheet and the preceding processed sheet are bonded together; and cutting the successive sheet about the perimeter of its predetermined portion to create a subsequent processed sheet. The method may also include repeating the steps of adding, curing and cutting a successive sheet for a plurality of cycles.

Prior to the adding step, the method may include applying an adhesive to the predetermined portion of the preceding processed sheet. And prior to the applying step, the method may further include masking at least part of the preceding processed sheet other than the predetermined portion.

Before the step of curing a predetermined portion of the successive sheet, the method may include masking at least part of the successive sheet other than the predetermined portion, and/or exerting pressure on at least the predetermined portion of the successive sheet.

The composite material may have an X+Y structural component/resin construction, where structural component X is carbon fiber, aramid, bamboo and/or fiberglass, and resin Y is a thermoreactive material, a photoreactive material, a pressure-reactive material and/or a chemically reactive material.

Each of the curing steps may include directing heat, light, pressure and/or an activating agent at the respective predetermined portion of a composite sheet. Each of the cutting steps may be effected by use of a laser, a cutting wheel, a drill, a milling tool, a saw, a heat knife, an air jet and/or a water jet. And at least one of the cutting steps may include cutting within the perimeter of the predetermined portion.

In another embodiment, an additive manufacturing method for producing a composite product may include: (i) positioning a sheet of composite material; (ii) curing a predetermined portion of the sheet; (iii) cutting the sheet about the perimeter of the predetermined portion to create a preceding processed sheet; (iv) adding a successive sheet of composite material atop and in contact with the preceding processed sheet; (v) curing a predetermined portion of the successive sheet such that the predetermined portions of the successive sheet and the preceding processed sheet are bonded together; (vi) cutting the successive sheet about the perimeter of its predetermined portion to create a subsequent processed sheet; and (vii) repeating the steps of adding, curing and cutting a successive sheet for a plurality of cycles.

Prior to the adding step, the additive manufacturing method may also include applying an adhesive to the predetermined portion of the preceding processed sheet. And prior to the applying step, the method may further include masking at least part of the preceding processed sheet other than the predetermined portion.

Before the step of curing a predetermined portion of the successive sheet, the additive manufacturing method may include masking at least part of the successive sheet other than the predetermined portion, and/or exerting pressure on at least the predetermined portion of the successive sheet.

Each of the curing steps of the additive manufacturing method may include directing heat, light, pressure and/or an activating agent at the respective predetermined portion of a composite sheet. Each of the cutting steps may be effected by use of a laser, a cutting wheel, a drill, a milling tool, a saw, a heat knife, an air jet and/or a water jet. And at least one of the cutting steps may include cutting within the perimeter of the predetermined portion.

In yet another embodiment, an additive manufacturing machine includes a subsystem for positioning a sheet of composite material, a subsystem for curing a predetermined portion of the sheet, a subsystem for cutting the sheet about the perimeter of the predetermined portion to create a processed sheet, and a controller operatively connected with the subsystems for positioning, curing and cutting. The controller has logic for executing the steps of: (i) positioning a sheet of composite material, (ii) curing a predetermined portion of the sheet, (iii) cutting the sheet about the perimeter of the predetermined portion to create a preceding processed sheet, (iv) adding a successive sheet of composite material atop and in contact with the preceding processed sheet, (v) curing a predetermined portion of the successive sheet such that the predetermined portions of the successive sheet and the preceding processed sheet are bonded together, (vi) cutting the successive sheet about the perimeter of its predetermined portion to create a subsequent processed sheet, and (vii) repeating the steps of adding, curing and cutting a successive sheet for a plurality of cycles.

The subsystem for curing may include a heat source, a light source, a pressure source and/or an activating agent source. The subsystem for cutting may include a laser, a cutting wheel, a drill, a milling tool, a saw, a heat knife, an air jet and/or a water jet. The machine may further include a subsystem for masking at least part of a selected composite sheet other than the predetermined portion of the sheet, wherein the controller is operatively connected with the subsystem for masking and has logic for executing the steps of (viii) masking at least part of a selected composite sheet other than the predetermined portion of such sheet, and (ix) repeating the step of masking for a plurality of cycles.

DETAILED DESCRIPTION

Figure 1:
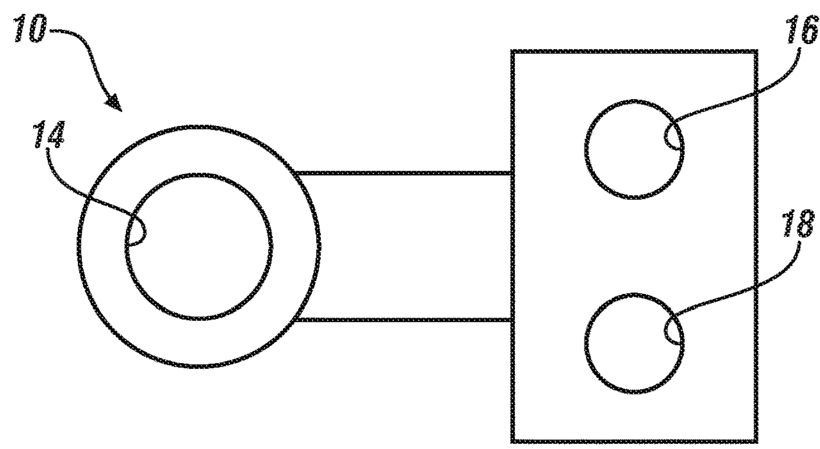
FIG. 1 is a top view of a composite product according to an embodiment of the disclosure.
Figure 2:
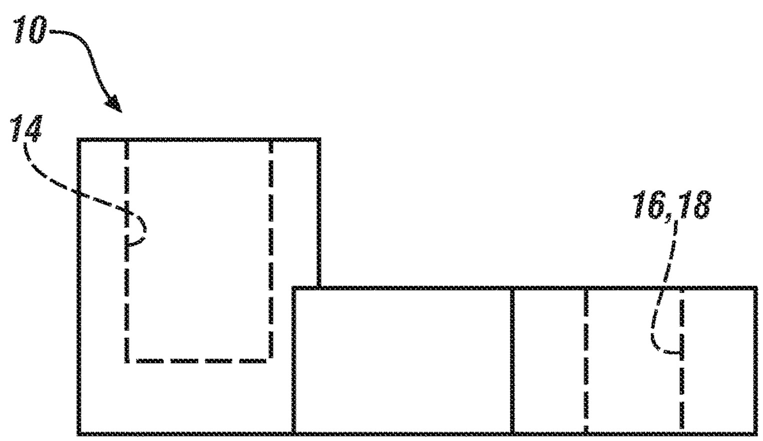
FIG. 2 is a side view of a composite product according to an embodiment of the disclosure.
Figure 3:
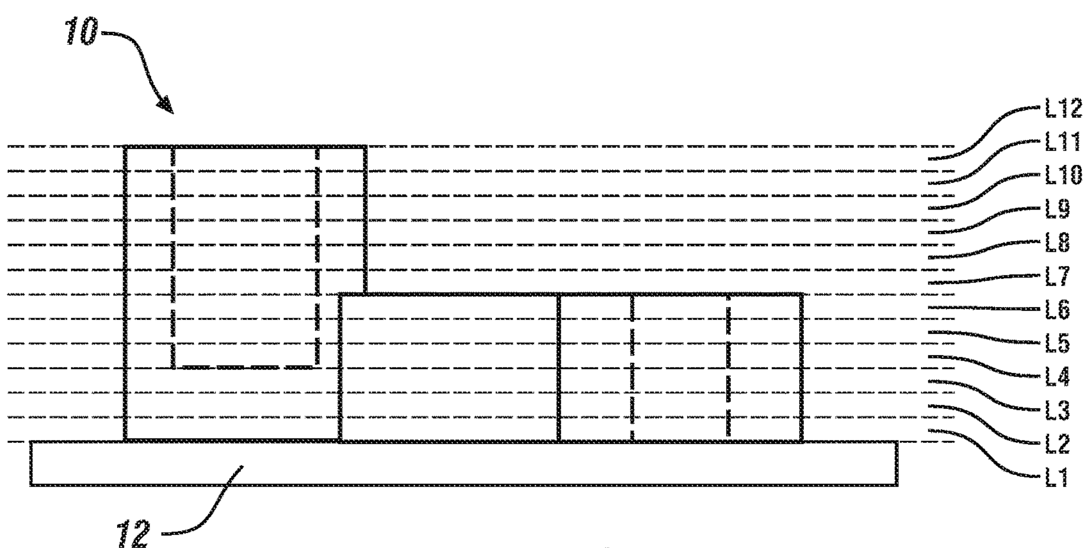
FIG. 3 is a side view of the layers for building up a composite product according to an embodiment of the disclosure

Referring now to the drawings, wherein like numerals indicate like parts in the several views, a method 100/200, a machine 300 and composite products produced by such methods and machines are shown and described herein.

Figure 4:
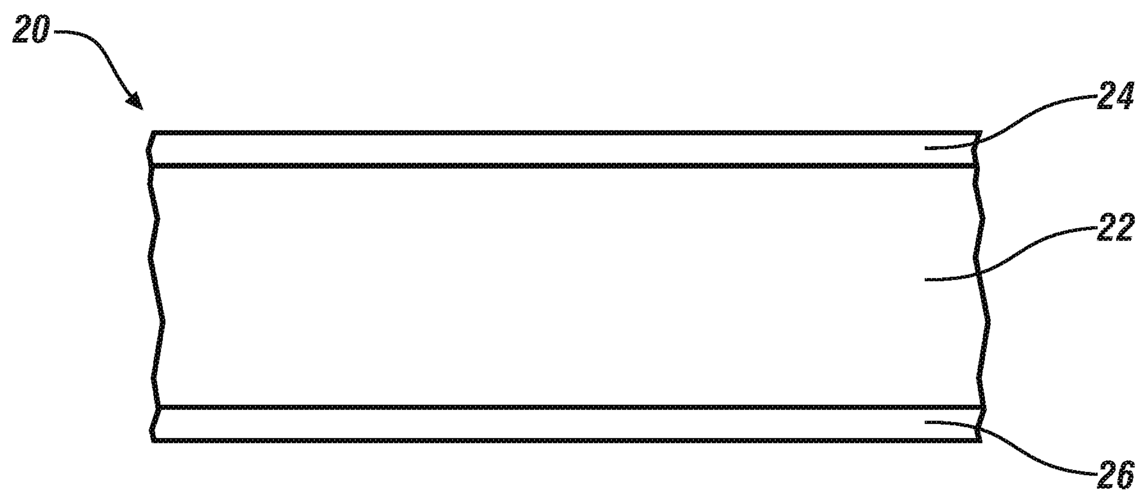
FIG. 4 is a cross-sectional view of a composite material sheet according to an embodiment of the disclosure.
Figure 5:
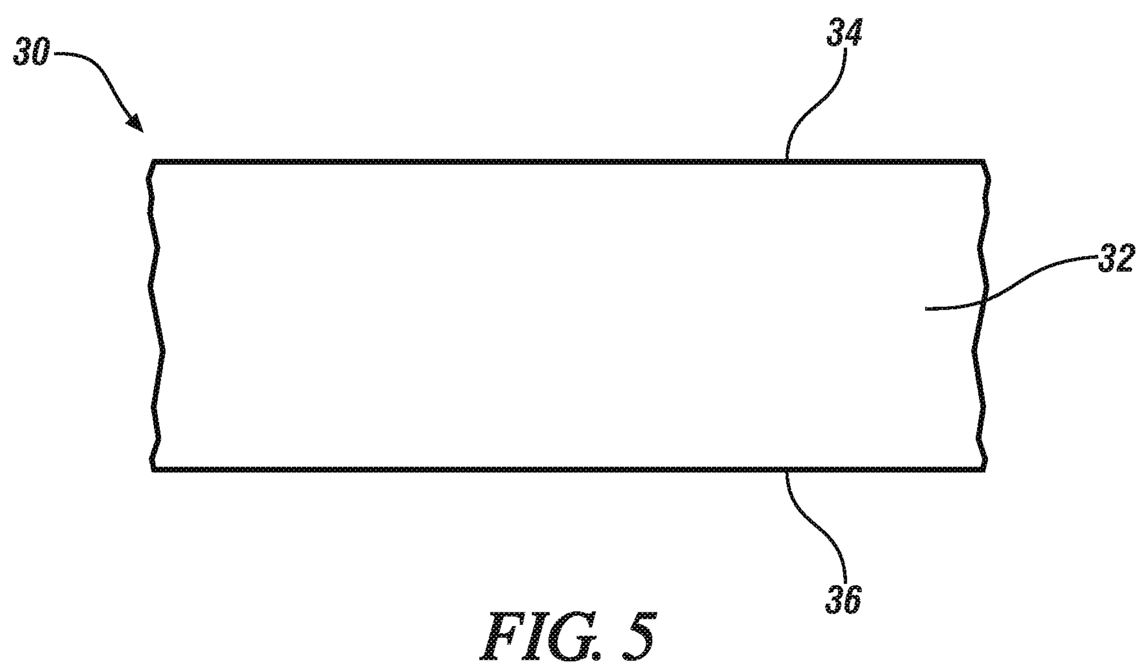
FIG. 5 is a cross-sectional view of another composite material sheet according to an embodiment of the disclosure.

The inventors of the present disclosure have developed an additive manufacturing process and a machine utilizing the process which overcomes the limitations of previous approaches and is suitable for producing both large and small structural components. One aspect of the inventors' approach which is disclosed herein is the use of sheets 20/30 of composite material as illustrated in FIGS. 4 and 5. The sheet 20 of composite material in FIG. 4 includes an inner layer 22 sandwiched between a top outer layer 24 and a bottom outer layer 26. The inner layer 22 may be a mat, a weaving or an arrangement of structural material such as carbon fiber, aramid, bamboo, fiberglass or the like to serve as a structural component. The structural material may be in the form of cloth, batting, fibers, strands or other suitable arrangement.

The outer layers 24/26 may be a resin or other material with adhesive or bonding properties. Suitable materials for these layers include epoxies, adhesives, polyesters, resins or other similar materials. These materials may coat the upper and lower surfaces or faces of the inner layer 22, and may also be infused into or dispersed within the inner layer 22. One well-known arrangement of this structure are sheets of "pre-preg", which are sheets of carbon fiber, aramid, bamboo, fiberglass, etc. that are coated and infused ("impregnated") with a resin. These sheets of pre-preg are typically "tacky" to the touch due to the exposed resin on both surfaces, so they are provided with "tear-off" or "peel-away" release/separator sheets (not shown) covering both surfaces 24/26.

FIG. 5 shows an alternative version of a composite material sheet or pre-preg 30. Here, there is no substantial coating or layer of resin on the top and bottom surfaces 34/36. Instead, the sheet 30 may comprise only structural material (e.g., a sheet of carbon fiber) and no resin at all, or the sheet 30 may comprise structural material with resin permeating the interior 32 of the sheet 30. As with the version shown in FIG. 4, the sheet 30 may have release/separator sheets (not shown) covering the top and bottom surfaces 34/36 to facilitate handling and positioning the sheets. When using sheets 20 according to FIG. 4, or sheets 30 according to FIG. 5 containing resin, the resin within/on the sheets 20/30 may comprise the first or "A" part of a two-part "A+B" resin/curing agent system. In such a case, the second or "B" part (i.e., a hardener, accelerant or other curing agent for curing the part "A" resin) may be applied separately as part of a curing step (described below).

Thus, the composite material sheets 20/30 may include an "X+Y" structural component/resin combination or composition, where structural component X may be carbon fiber, aramid, bamboo, fiberglass or the like, and resin Y may be a thermoreactive material, a photoreactive material, a pressure-reactive material, a chemically reactive material or the like. This X+Y combination or composition may take the form of the sheets 20/30 as illustrated in FIGS. 4 and 5.

It should be noted that the terms "upper", "lower", "top" and "bottom", as used herein, are relative (not fixed) and refer to the orientation of the composite sheet surfaces as the sheets 20/30 are positioned for use in the disclosed process. Thus, either surface of a sheet may be a top/upper surface or a bottom/lower surface, depending on how the sheet is oriented. Likewise, the words "preceding", "previous", "successive" and "subsequent" are used herein to denote the relative order or sequence in which a sheet may be presented or used, in relation to other sheets used earlier or later in the additive manufacturing method 100/200 according to the present disclosure.

Figure 6A:
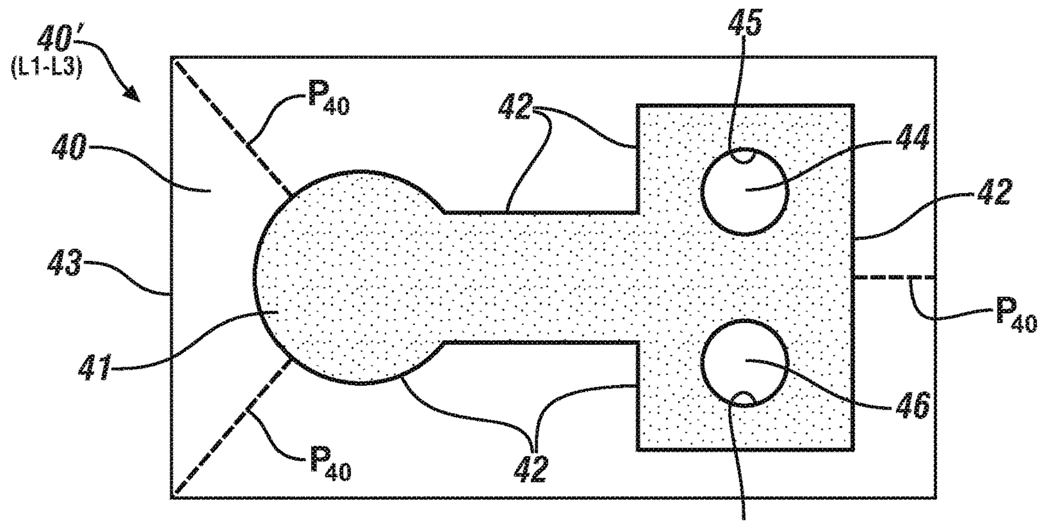
FIGS. 6A-C show top views of three different layers of processed composite material sheets according to an embodiment of the disclosure.
Figure 6B:
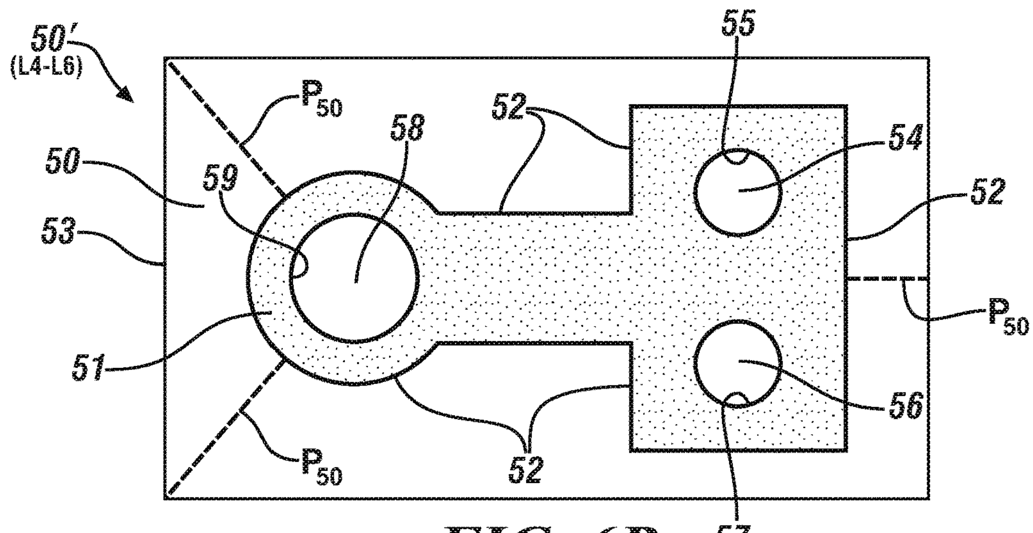
Figure 6C:
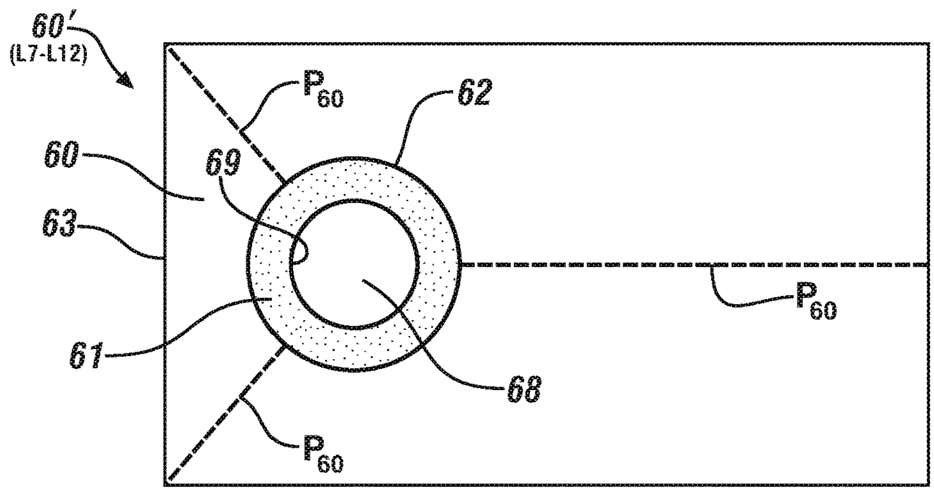
Figure 7:
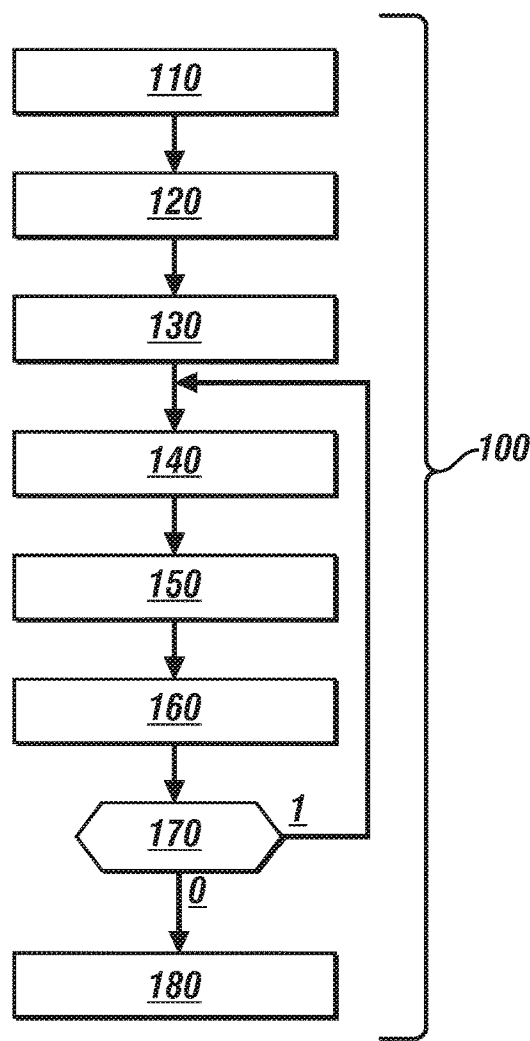
FIG. 7 is a flowchart for an additive manufacturing method according to an embodiment of the disclosure.

FIGS. 6A-C show top views of three different layers of composite material sheets 40/50/60 according to an embodiment of the disclosure, and FIG. 7 shows a flowchart for an additive manufacturing method 100 according to an embodiment of the disclosure. In step 110, a sheet 40 of composite material is positioned (e.g., on a platen 12 of a work station) as a first layer L1 for further processing. Step 110 may be carried out manually by human operators or by use of automated material handling equipment.

In step 120, a predetermined portion, area or region 41 of the sheet 40 is cured. This predetermined portion 41 has a perimeter 42 that fits within the outer perimeter or border 43 of the composite sheet 40. As illustrated in FIGS. 1-3 and 6A-C, the predetermined portion of each sheet or layer corresponds to a laminar "slice" of the desired composite product. The curing step 120 may be accomplished by selectively directing heat, light, pressure and/or an activating agent at the predetermined portion 41 of the composite sheet 40. Depending on the type of resin used within or on the surfaces of the sheet, a particular type of curant (or combination of curants) may be used. For example, a photoreactive resin may require a particular frequency range of light (e.g., ultraviolet (UV), infrared, coherent laser light) to be used as the curant for curing the portion 41 of the sheet 40 that is exposed to the light. As another example, a pressure-reactive resin may be cured by the application of pressure focused on the predetermined portion of the sheet. Additionally, a thermoreactive resin may be cured by using heat and/or infrared energy directed at the region(s) 41 of the sheet 40 desired to be cured, and a chemically reactive resin may be cured by using an appropriate chemical agent (e.g., an activator, accelerator, catalyst, etc.) as the curant. For example, the resin within/on a composite sheet 40 may comprise the first or "A" part of a two-part "A+B" resin/curing agent system. In such a case, the second or "B" part (i.e., a hardener, accelerant or other curing agent for curing the part "A" resin) may be applied to the predetermined portion 41 as part of the curing step 120, such as by a print head sweeping over the sheet 40. When the part "B" component comes into contact with the part "A" component within the predetermined portion or area 41, that area 41 becomes cured as components "A" and "B" chemically interact. Alternatively, the composite sheet 40 may comprise only structural material (e.g., a woven sheet of carbon fiber) without any resin, and the curing step 120 may comprise the application of resin only to the predetermined portion 41 followed by curing the resin by applying the appropriate curant/curing medium.

It should be noted that "curing" is a process of transforming the predetermined portion of the sheet at which the curant or curing medium is directed from a first substantially "uncured" state to a second substantially "cured" state. In this cured state, the resin within the predetermined portion is made more stiffened, hardened, densified or the like than it was before the application of the curant or curing medium. As used herein, "curant" or "curing medium" means a substance (e.g., a chemical), a form of energy (e.g., heat or light) or a set of conditions (e.g., the application of pressure) which causes, urges, facilitates or accelerates the curing or transformation of the resin.

In step 130, after the predetermined portion 41 of the sheet 40 has been cured, the sheet 40 is then cut about the perimeter 42 of the predetermined portion 41 to create a preceding or initial processed sheet 40'. In addition to cutting about (i.e., at or just outside of) the perimeter 42 of the predetermined portion 41, the sheet may also be cut within (i.e., inside of) the perimeter 42 of the predetermined portion 41, as illustrated by the holes 44/46 formed by cutting the composite sheet at the respective perimeters 45/47 of the holes 44/46. These interior cuts may be performed to "hollow out" certain portions of the composite product or to create holes, pockets, interior cavities, interior surfaces, flow passages, etc. These interior cut portions may be removed and optionally filled with material (such as resin, a material having a lower melting point than the resin, etc.), or the cut portions may be left in place (not removed) in order to serve as "supports" for cured portions in successive layers on top of these supports (e.g., to prevent sagging). The cutting step 130 may be effected or accomplished by use of a laser (e.g., a high-power cutting laser), a cutting wheel, a drill, a milling tool, a saw, a heat knife, an air jet, a water jet or similar cutting device.

In step 140, a successive sheet 50 of composite material is added atop and in contact with the preceding processed sheet 40'. Then, in step 150, a predetermined portion 51 of the successive sheet 50 is cured, such that the predetermined portions 51/41 of the successive sheet 50 and the preceding processed sheet 40' are bonded together. This predetermined portion 51 has a perimeter 52 that fits within the perimeter or border 53 of the composite sheet 50. Note that regions 58, 54 and 56 are not cured, and correspond to holes 14, 16 and 18, respectively, in FIGS. 1 and 2. And in step 160, the successive sheet 50 is cut about the perimeter 52 of its predetermined portion 51 (and optionally within the perimeter 52 as well to create uncured regions 54/56/58 defined by their respective perimeters 55/57/59) to create a subsequent/successive processed sheet 50'.

Referring to FIGS. 1-3 and 6A-C, note that layers L1, L2 and L3 may be produced using the predetermined portion pattern 41 of sheet 40. Likewise, layers L4, L5 and L6 may be produced using the predetermined portion pattern 51 of sheet 50, and layers L7 through L12 may be produced using the predetermined portion pattern 61 of sheet 60. After a layer has been created by selectively curing and cutting a composite sheet to produce a preceding processed sheet, a next/successive layer is created by placing an uncured/unprocessed composite sheet atop the preceding/previously processed sheet, and then curing and cutting that next/successive sheet. This process is repeated layer upon layer, until the desired composite product is achieved.

Note that reference numerals 40, 50 and 60 without accent marks represent unprocessed composite sheets that have not been cured or cut, while these numerals with accent marks (i.e., 40', 50' and 60') represent cured-and-cut/processed sheets. The process of building up the composite product layer-by-layer may proceed as follows. A first unprocessed sheet 40 is positioned, cured and cut to produce a first processed sheet 40', which serves as the layer L1 portion of the composite product and also serves as the "preceding" processed sheet for layer L2. Next, a second (successive) unprocessed sheet 40 is placed on the first (preceding) processed sheet 40', and is cured and cut to produce a second processed sheet 40' serving as layer L2. At this point, there are only two layers completed: L1 and L2. Next, a third (successive) unprocessed sheet 40 is placed on the second (preceding) processed sheet 40', and is cured and cut to produce a third processed sheet 40' serving as layer L3. Note that the same predetermined portion pattern and perimeters 41/42/45/47 are used for these first three layers L1-L3; however, layers L4-L6 utilize a slightly different predetermined portion pattern and perimeters 51/52/55/57/59 (i.e., these layers have a hole 58 defined by its perimeter 59, which layers L1-L3 did not have).

After layer L3 has been produced, a fourth (successive) unprocessed sheet 50 is placed on the third (preceding) processed sheet 40', and is cured and cut to produce a fourth processed sheet 50' serving as layer L4. Next, a fifth (successive) unprocessed sheet 50 is placed on the fourth (preceding) processed sheet 50', and is cured and cut to produce a fifth processed sheet 50' serving as layer L5. Next, a sixth (successive) unprocessed sheet 50 is placed on the fifth (preceding) processed sheet 50', and is cured and cut to produce a sixth processed sheet 50' serving as layer L6. Note that the same predetermined portion pattern and perimeters 51/52/55/57/59 are used for these fourth, fifth and sixth layers L4-L6; however, layers L7-L17 utilize a different predetermined portion pattern and perimeters 61/62/69 (i.e., essentially a ring-shaped region only, having a hole 68).

After layer L6 has been produced, a seventh (successive) unprocessed sheet 60 having a perimeter or border 63 is placed on the sixth (preceding) processed sheet 50', and is cured and cut to produce a seventh processed sheet 60' serving as layer L7. Next, an eighth (successive) unprocessed sheet 60 is placed on the seventh (preceding) processed sheet 60', and is cured and cut to produce an eighth processed sheet 50' serving as layer L8. This process is repeated until the final layer L12 is completed.

When a successive layer or sheet of composite material is positioned atop the previously cured and cut layer or sheet, the two sheets will be in contact with each other, with the predetermined portion or area of the successive sheet being positioned directly on top of the predetermined portion or area of the preceding/previously processed sheet. Then, when the successive sheet's predetermined portion is being cured, the curing resin will bond the two sheets together at their predetermined portions (but will not substantially bond the sheets together at other areas that are not part of the predetermined portions).

At step 170, if the composite product is not yet completed, then the process continues by repeating the steps of adding, curing and cutting successive sheets (steps 140/150/160) for a plurality of cycles until the method 100 is completed (step 180) and a three-dimensional composite product is produced. The composite product may optionally undergo further processing, such as sanding, buffing, polishing, primer application, painting, electroplating, autoclaving, having portions drilled or cut out, having further reinforcements added, and the like. For example, holes and voids that were created during the layer-by-layer build-up method 100, or drilled/cut into the composite product at the end of the method 100, may be outfitted with additional structural reinforcements (such as metal stakes, brackets or the like pressed into holes, fastened into voids, etc.), or the holes/voids may be filled with additional resin and directional fibers, to increase the out-of-plane strength of the composite product. Also, after a successive composite sheet is laid atop the preceding processed sheet, the successive sheet may be punched or pressed with a tool at selected locations within the successive sheet's predetermined portion area in order to accomplish "pinning" or "inter-layer riveting", where the punched or pressed regions of the successive sheet are pressed/driven into the underlying preceding sheet. Additional resin and/or structural material may be added to such punched or pressed areas, since a small divot may be created thereat. Furthermore, after each layer or sheet has been initially cured as part of the foregoing method 100 and the layered build-up process is complete, the composite product may undergo a further curing or "post-curing" step. This may be done for increased bonding, improved mechanical properties and greater temperature resistance, and may be carried out by exposing the completed product to an elevated temperature for a specified time, either on the same machine where the component was produced or in a separate oven, autoclave or the like. Moreover, one or more of the sheets or layers may also include one or more perforations or seams $P_{40}/P_{50}/P_{60}$ formed as part of the cutting steps, where the perforations or seams $P_{40}/P_{50}/P_{60}$ extend from the perimeter 42/52/62 of each predetermined portion 41/51/61 to the edge or border 43/53/63 of the respective sheet 40/50/60. These perforations or seams $P_{40}/P_{50}/P_{60}$ may be cut all the way through the sheet 40/50/60 or only part-way through, may be cut in a straight or non-straight line, and may be cut in a continuous line or in a perforated, segmented or "dashed" line. Such perforations $P_{40}/P_{50}/P_{60}$ may facilitate separation and removal of the finished composite product 10 from the surrounding non-cured sheet layers. Although not shown in the drawings, perforations may also be included inside the perimeter 42/52/62 of the predetermined portions 41/51/61 to facilitate removal of uncured interior portions of the sheets 40/50/60.

Figure 8:
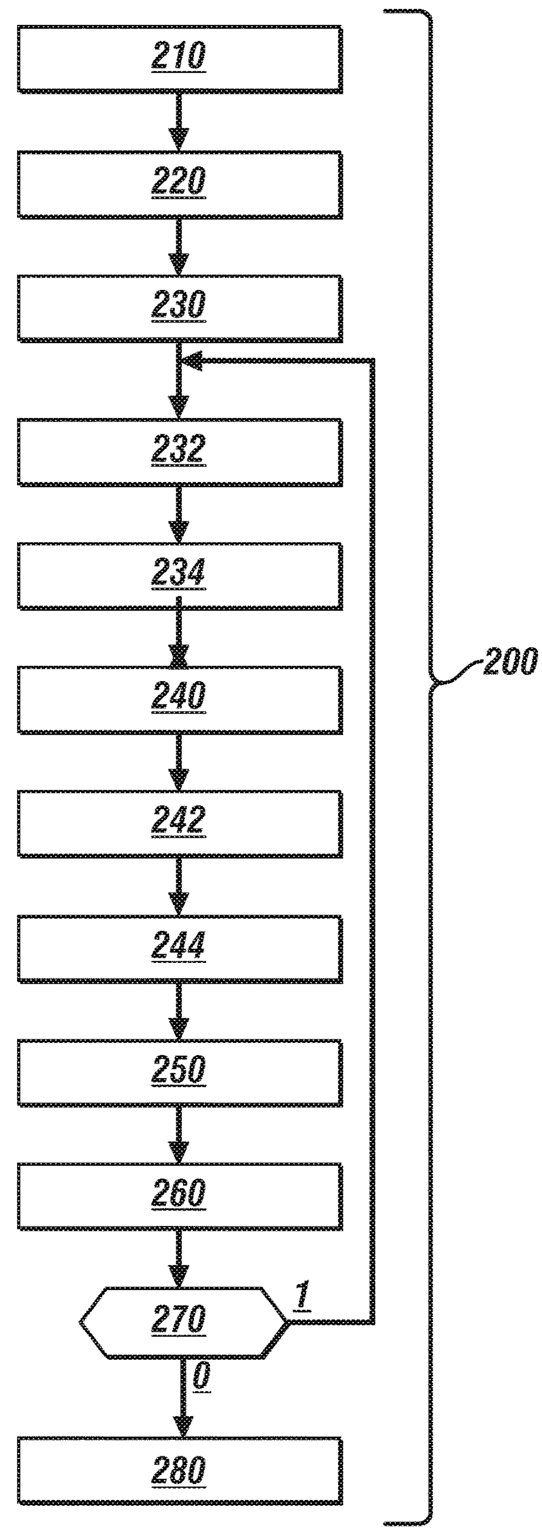
FIG. 8 is a flowchart for an additive manufacturing method according to an embodiment of the disclosure.

FIG. 8 shows a flowchart for an additive manufacturing method 200 for producing a composite product according to another embodiment of the disclosure. In step 210 a sheet of composite material is positioned, in step 220 a predetermined portion of the sheet is cured, and in step 230 the sheet is cut about the perimeter of the sheet's predetermined portion to create a preceding processed sheet. In step 240, a successive sheet of composite material is added atop and in contact with the preceding processed sheet, and in step 250 a predetermined portion of the successive sheet is cured such that the predetermined portions of the successive sheet and the preceding processed sheet are bonded together. In step 260 the successive sheet is cut about the perimeter of its predetermined portion to create a subsequent processed sheet. In step 270, if the composite product is not yet completed, then the process continues by repeating the steps of adding, curing and cutting successive sheets (steps 240/250/260) for a plurality of cycles until the composite product is completed (step 280).

Prior to the adding step 240, an additional step 234 may be carried out of applying an adhesive to the predetermined portion of the preceding processed sheet. This adhesive may be the same as the resin used in the composite sheets, or it may be a different material with compatible bonding, accelerating or other beneficial properties. Prior to this step 234 of applying an adhesive, a further additional step 232 may be carried out of masking at least part of the preceding processed sheet other than the sheet's predetermined portion. The mask may contain apertures that directly correspond in shape and size to the predetermined portion of the preceding processed sheet, such that when the mask is placed in registration over the preceding processed sheet, the preceding sheet's predetermined portion is exposed through the apertures while the other portions of the preceding sheet are masked (i.e., obscured or covered), such that the adhesive may be applied onto (and only onto) the predetermined portion of the preceding processed sheet.

After the step 240 of adding a successive composite sheet onto the preceding processed sheet, but before the step 250 of curing a predetermined portion of the successive sheet, an additional step 242 may be carried out of masking at least part of the successive sheet other than the predetermined portion. Similar to the mask described above for step 234, the mask in step 242 may contain apertures that directly correspond in shape and size to the predetermined portion of the successive sheet, such that when the mask is placed in registration over the successive sheet, the successive sheet's predetermined portion is exposed through the apertures while the other portions of the successive sheet are masked (i.e., obscured or covered). With only the predetermined portions of the successive sheet exposed through the apertures, the curant or curing method of step 250 may be applied onto (and only onto) the predetermined portion of the successive sheet.

Between the step 240 of adding a successive sheet and the step 250 of curing its predetermined portion, a further additional step 244 may be carried out of exerting pressure on at least the predetermined portion of the successive sheet. This pressure may serve to cure the resin if it is pressure-reactive; however, even if the resin is not pressure-reactive, the exerted pressure may assist in other ways, such as in the curing process when the resin is thermoreactive.

Like method 100 described earlier, in addition to cutting about the perimeter of the predetermined portion of a preceding or successive sheet, the cutting steps 230/260 of method 200 may also include cutting a sheet within the perimeter of the sheet's predetermined portion (e.g., to create the holes and voids illustrated in FIGS. 1-3 and 6A-C). Additionally, after each layer or sheet has been initially cured as part of the foregoing method 200 and the layered build-up process is complete, the composite product may undergo a further curing or "post-curing", either on the same machine where the component was produced or in a separate oven, autoclave or the like.

Figure 9:
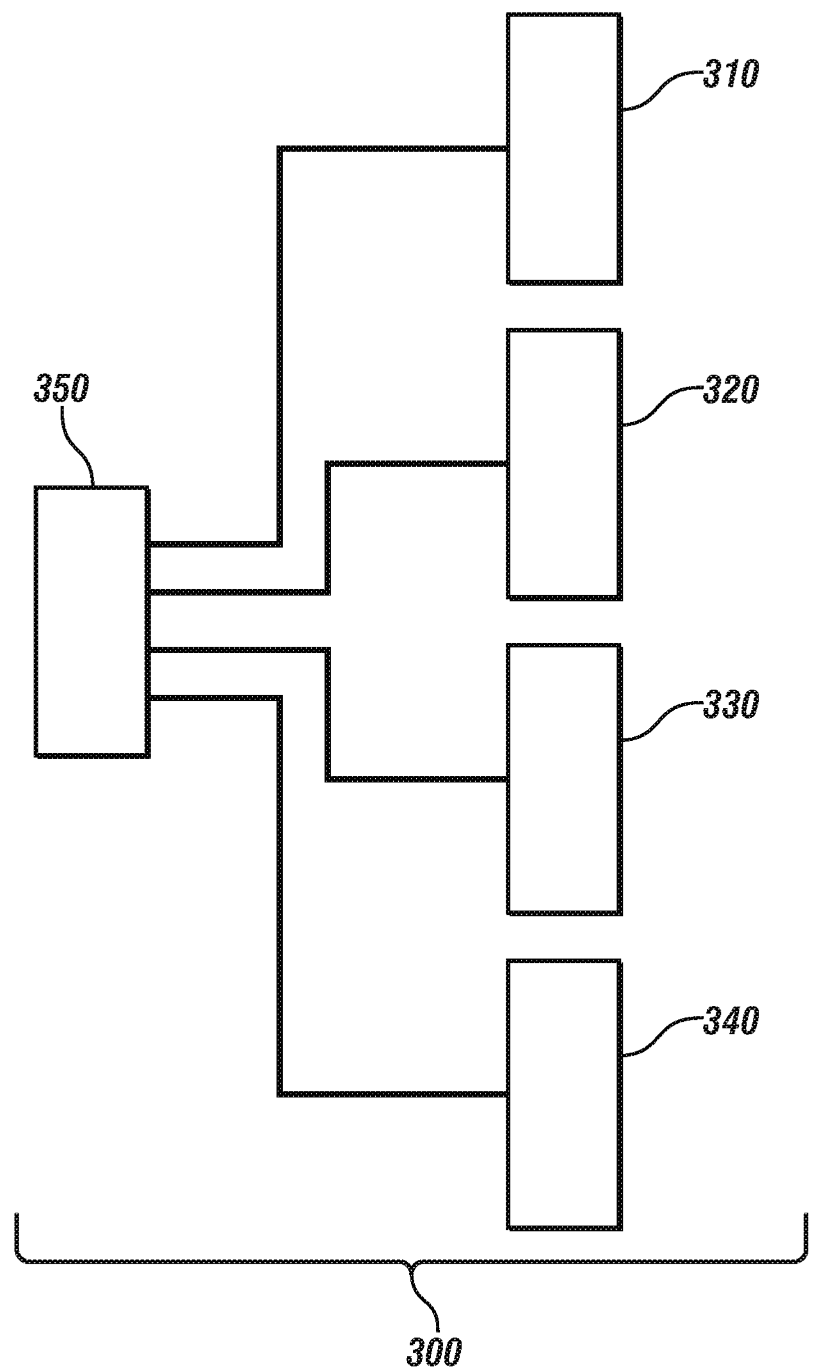
FIG. 9 is a schematic for an additive manufacturing machine according to an embodiment of the disclosure.

FIG. 9 shows a schematic for an additive manufacturing machine 300 according to an embodiment of the disclosure. The machine 300 includes a subsystem 310 for positioning a sheet of composite material, a subsystem 320 for curing a predetermined portion of the sheet, and a subsystem 330 for cutting the sheet about the perimeter of the predetermined portion to create a processed sheet. The machine 300 also includes a controller 350 operatively connected with the subsystem for positioning 310, the subsystem for curing 320, and the subsystem for cutting 330. The controller 350 has logic for executing the steps of: (i) positioning a sheet of composite material, (ii) curing a predetermined portion of the sheet, (iii) cutting the sheet about the perimeter of the predetermined portion to create a preceding processed sheet, (iv) adding a successive sheet of composite material atop and in contact with the preceding processed sheet, (v) curing a predetermined portion of the successive sheet such that the predetermined portions of the successive sheet and the preceding processed sheet are bonded together, (vi) cutting the successive sheet about the perimeter of its predetermined portion to create a subsequent processed sheet, and (vii) repeating the steps of adding, curing and cutting a successive sheet for a plurality of cycles.

The subsystem for positioning 310 may include automated material handling equipment. The subsystem for curing 320 may include a heat source, a light source, a pressure source and/or an activating agent source. The selection of the appropriate subsystem for curing 310 depends on the curant or curing method required for the resin that is utilized. The subsystem for cutting 330 may include a laser, a cutting wheel, a drill, a milling tool, a saw, a heat knife, an air jet and/or a water jet.

The machine 300 may further include one or more additional subsystems 340 (denoted by the dashed lines in FIG. 9). This may include a subsystem 340 for masking at least part of a selected composite sheet other than the predetermined portion of such sheet, where the controller 350 is operatively connected with the subsystem for masking and has logic for executing the steps of (viii) masking at least part of a selected composite sheet other than the predetermined portion of such sheet, and (ix) repeating the step of masking for a plurality of cycles. The machine 300 may also include a way of positioning the composite sheets in multiple orientations. This may be particularly useful when utilizing composite sheets where the fibers or structural components are laid out in a substantially unidirectional manner, thus allowing for a plurality of fiber directions to increase the strength of the resulting product. This may be accomplished by the subsystem for positioning 310 or as a separate subsystem 340, and may include a build platform or platen that rotates about the Z (vertical) axis, or the subsystem that positions the composite sheets could rotate about the build platform or platen. The machine may also include a subsystem 340 for post-curing the composite product after completion of the layered build-up process, which may include an arrangement of heating elements along with insulated walls for containing the heat produced by the heating elements. Where any additional subsystems 340 are provided, the controller 350 is operatively connected with each subsystem 340 and contains logic for controlling and/or executing the activity associated with each subsystem 340.

Each of the subsystems 310/320/330/340 is adapted to interface and communicate with the controller 350 for carrying out the process described above (which may be similar to the methods 100/200 described earlier in this disclosure). The controller logic for carrying out the foregoing steps may be any suitable combination of hardware, software and/or firmware.

The methods 100/200 and machine 300 described above, as well as the composite products produced thereby, present numerous advantages over previously known 3DP/AM methods, machines and products. For example, the methods 100/200 and machine 300 can use commercially-available prepreg sheets (containing resin) or "dry" sheets (comprising structural material only and containing no resin) to create each layer, whereas other 3DP/AM approaches do not utilize sheets of composite material but rely on a very large number of small, individual depositions to create each layer. Therefore, the cost of the raw material, and the time required to produce each layer, is greatly reduced for the methods 100/200 and machine 300 of this disclosure compared to other known approaches. Additionally, the breadth of materials that can be used for the methods 100/200 and machine 300 (e.g., carbon fiber, aramid, bamboo, polyester, etc., as well as various resin systems/curing methodologies), plus the arrangement and format of the structural material used in the composite sheets (e.g., unidirectional fibers, multi-directional fibers, cloths, ribbons, battings, weaves, mats, etc.) is vastly greater than with other known approaches.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to be illustrative, they are by no means limiting and are exemplary embodiments. Many other embodiments will be apparent to those of skill in the art upon reviewing the above description. Moreover, in the following claims, any use of the terms "first", "second", "top", "bottom", etc. are used merely as labels, and are not intended to impose numerical or positional requirements on their objects. Further, the limitations of the following claims are not written in means-plus-function or step-plus-function format and are not intended to be interpreted as such, unless and until such claim limitations expressly use the phrase "means for" or "step for" followed by a statement of function void of further structure. As used herein, an element or step recited in the singular and preceded by the word "a" or "an" should be understood as not excluding plural of such elements or steps, unless such exclusion is explicitly stated. Furthermore, any references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function (s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement any of the functions and/or actions specified in the flowcharts and block diagrams.

This written description uses examples, including the best mode, to enable those skilled in the art to make and use devices, systems and compositions of matter, and to perform methods, according to this disclosure. It is the following claims, including all equivalents, which define the scope of the present disclosure.

What is claimed is:

1. An additive manufacturing method, comprising steps of:

positioning a sheet of curable composite material;

curing a predetermined portion of the sheet;

cutting the sheet about a perimeter of the predetermined portion of the sheet to create a preceding processed sheet;

masking at least part of the preceding processed sheet other than its predetermined portion;

applying an adhesive to the predetermined portion of the preceding processed sheet;

adding a successive sheet of curable composite material atop and in contact with the preceding processed sheet;

curing a predetermined portion of the successive sheet such that the predetermined portions of the successive sheet and of the preceding processed sheet are bonded together; and cutting the successive sheet about a perimeter of the predetermined portion of the successive sheet to create a subsequent processed sheet.

2. A method according to claim 1, further comprising:

repeating the steps of adding, curing a predetermined portion of the successive sheet and cutting a successive sheet of curable composite material for a plurality of cycles.

3. A method according to claim 1, further comprising, prior to the step of curing a predetermined portion of the successive sheet:

masking at least part of the successive sheet other than the predetermined portion of the seccussive sheet.

4. A method according to claim 1, further comprising, prior to the step of curing a predetermined portion of the successive sheet:

exerting pressure on at least a portion of the successive sheet.

5. A method according to claim 1, wherein the curable composite materials comprises an X+Y structural component/resin combination, wherein structural component X is selected from the group consisting of carbon fiber, aramid, bamboo and fiberglass, and resin Y is selected from the group consisting of a thermoreactive material, a photoreactive material, a pressure-reactive material and a chemically reactive material.

6. A method according to claim 1, wherein each said curing step comprises directing at least one selected from the group consisting of heat, light, pressure and an activating agent at each said predetermined portion.

7. A method according to claim 1, wherein each said cutting step is effected by at least one selected from the group consisting of a laser, a cutting wheel, a drill, a milling tool, a saw, a heat knife, an air jet and a water jet.

8. A method according to claim 1, further comprising:

cutting the successive sheet within the perimeter of the predetermined portion of the successove sheet.

9. An additive manufacturing method for producing a composite product, comprising steps of:

positioning a sheet of curable composite material;

curing a predetermined portion of the sheet;

cutting the sheet about a perimeter of the predetermined portion of the sheet to create a preceding processed sheet;

masking at least part of the preceding processed sheet other than its predetermined portion;

applying an adhesive to the predetermined portion of the preceding processed sheet;

adding a successive sheet of curable composite material atop and in contact with the preceding processed sheet;

curing a predetermined portion of the successive sheet such that the predetermined portions of the successive sheet and of the preceding processed sheet are bonded together;

cutting the successive sheet about a perimeter of the predetermined portion of the successive sheet to create a subsequent processed sheet; and repeating the steps of adding, curing a predetermined portion of a successive sheet and cutting a successive sheet of curable composite material for a plurality of cycles.

10. A method according to claim 9, further comprising, prior to the step of curing the predetermined portion of the successive sheet:

masking at least part of the successive sheet other than the predetermined portion of the successive sheet.

11. A method according to claim 9, further comprising, prior to the step of curing a predetermined portion of the successive sheet:

exerting pressure on at least a portion of the successive sheet.

12. A method according to claim 9, further comprising: cutting the successive sheet within the perimeter of the predetermined portion of the successive sheet.

* * * * *